United States Patent
Kennard et al.

(10) Patent No.: US 9,414,659 B2
(45) Date of Patent: Aug. 16, 2016

(54) PROTECTIVE CASE FOR MOBILE ELECTRONIC DEVICE

(71) Applicant: Nottingham Spirk Design Associates, Cleveland, OH (US)

(72) Inventors: Geoffrey Kennard, Chardon, OH (US); Marc Vitantonio, South Russell, OH (US); Patrick Brown, Cleveland Heights, OH (US)

(73) Assignee: Fellowes, Inc., Itasca, IL (US)

(*) Notice: Subject to any disclaimer, the term of this patent is extended or adjusted under 35 U.S.C. 154(b) by 0 days.

(21) Appl. No.: 14/035,426

(22) Filed: Sep. 24, 2013

(65) Prior Publication Data

US 2015/0083619 A1    Mar. 26, 2015

(51) Int. Cl.
    *B65D 85/00*    (2006.01)
    *A45C 11/00*    (2006.01)
    *H04B 1/3888*   (2015.01)

(52) U.S. Cl.
    CPC .............. *A45C 11/00* (2013.01); *H04B 1/3888* (2013.01); *A45C 2011/002* (2013.01); *A45C 2011/003* (2013.01); *G06F 2200/1633* (2013.01)

(58) Field of Classification Search
    CPC   G06F 1/1628; A45C 2013/025; A45C 11/00; A45C 2011/001; A45C 2011/002; A45C 2011/003; H04B 1/3888; H04B 2001/3894; B65D 85/00

USPC ............ 206/320, 724, 811; 455/575.8; 361/679.02, 679.55
    See application file for complete search history.

(56) References Cited

U.S. PATENT DOCUMENTS

| | | | | |
|---|---|---|---|---|
| 4,584,718 A | * | 4/1986 | Fuller | 455/351 |
| 5,996,790 A | * | 12/1999 | Yamada | G03B 17/08 206/316.1 |
| 6,634,494 B1 | * | 10/2003 | Derr | G01D 11/24 206/305 |
| 8,762,704 B2 | * | 6/2014 | Rothkopf et al. | 713/100 |
| 2007/0261978 A1 | * | 11/2007 | Sanderson | 206/320 |

\* cited by examiner

*Primary Examiner* — Jacob K Ackun
*Assistant Examiner* — Rafael Ortiz
(74) *Attorney, Agent, or Firm* — Renner, Otto, Boisselle & Sklar LLP.

(57) ABSTRACT

A protective case for a mobile electronic device includes a shell defining a cavity for receiving a portion of the mobile electronic device within the cavity. The shell includes a membrane disposed adjacent a location corresponding to a screen of the mobile electronic device such that at least some of the screen of the mobile electronic device is viewable through the membrane. The shell also includes a gate disposed adjacent a location corresponding to a port of the mobile electronic device. The gate includes elastomeric flaps and is operable to at least two states including: a) a port covering state in which ends of the elastomeric flaps converge at at least one seam to close the gate protecting the port from environment outside of the protective case, and b) a port accessing state in which the elastomeric flaps separate and fold in to open the gate providing a passageway for a connector to be connected to the port of the mobile electronic device.

18 Claims, 4 Drawing Sheets

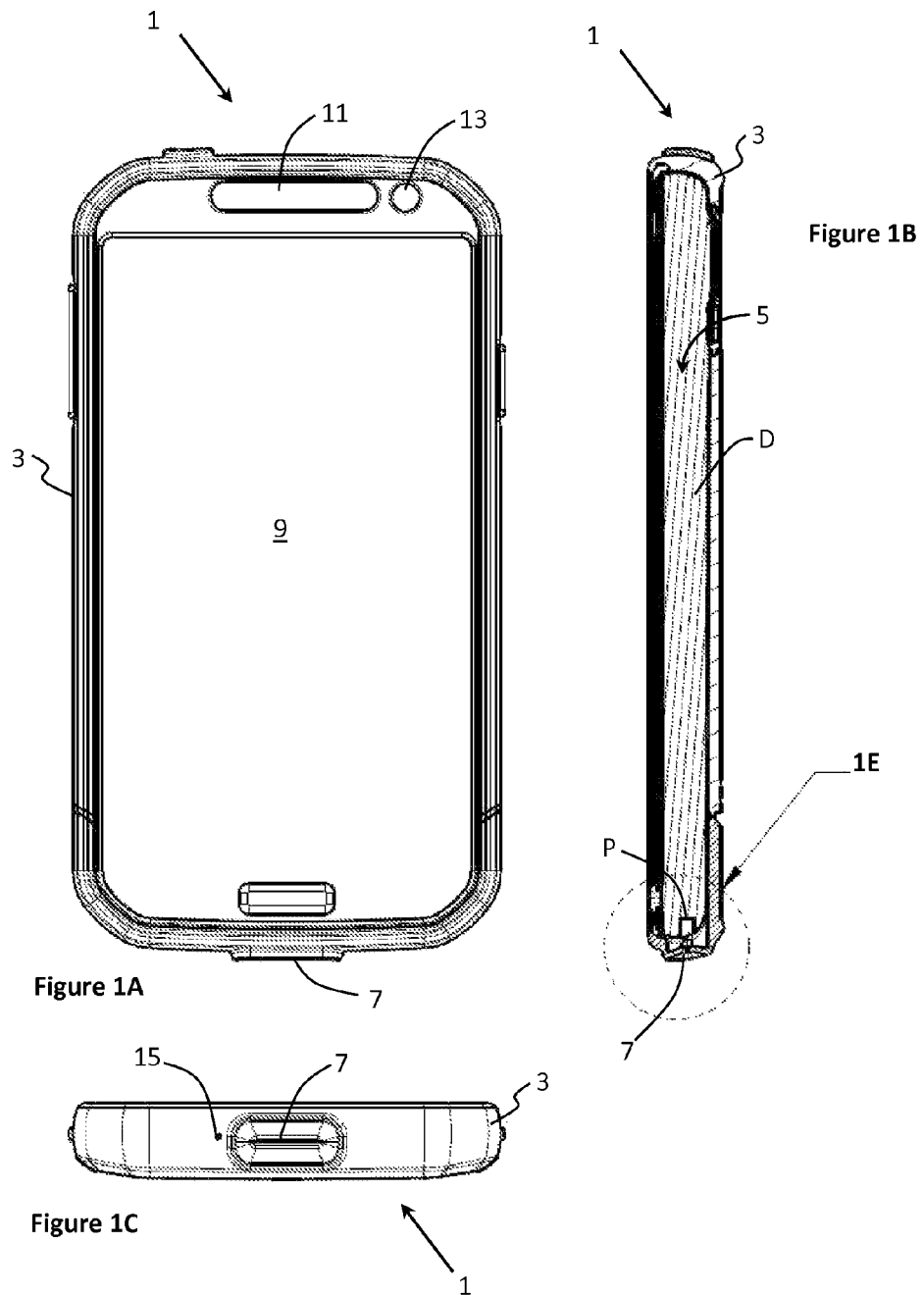

PROTECTIVE CASE FOR MOBILE ELECTRONIC DEVICE

FIELD OF THE INVENTION

The present disclosure relates generally to mobile electronic devices such as mobile telephones and smartphones, tablet computers, cellular-connected laptop computers, and similar devices. More particularly, the present disclosure relates to protective cases for mobile electronic devices.

BACKGROUND

Mobile electronic devices are ever increasing in popularity. While these devices continue to evolve with an ever increasing list of features and capabilities, they still suffer from a long-standing problem: their vulnerability to the elements. These devices are susceptible to damage from general wear and tear, most noticeably the scratching of the devices' bodies and screens. The devices are also vulnerable to damage from moisture and dust. Protective cases have therefore been developed to protect them from these elements.

Conventional protective cases offer somewhat enhanced face, side, and back scratch and shock protection for the mobile electronic device, but leave the screen, switches, and ports (e.g., headphone ports, power ports, data ports, etc.) exposed to the environment. Some models may include a screen protector that may be applied as a separate component from the protective case. As these screen protectors are not an incorporated component of the product, however, they protect the screen from scratching, but they do not protect the mobile electronic device from moisture or dust. Other conventional protective cases may provide some protection against moisture and dust, but only for the electronics and not the screen.

Protective cases that do provide moisture and dust protection for the complete device may not allow for view and/or use of the device's touch screen when the device is in the protective case. More adept conventional protective cases may allow a user to view and use the device's touch screen when the device is inside the protective case, but are large and cumbersome, turning a small and, some would say, elegant mobile electronic device into a large, inelegant, plastic-covered device.

Some of the more adept conventional protective cases protect ports (e.g., headphone ports, power ports, data ports, etc.) of the mobile device with loose rubber plugs or rubber plugs attached to tethers. Typically, the plugs insert in the ports to seal the ports from water and dust ingress. The rubber plugs rely on friction from the mobile electronic device's ports to hold the plugs in place. This often results in loose plugs or in blocked ports from, for example, plugs breaking off from their tethers.

In addition, when a plug at an end of a rubber tether is unplugged from a port, the tether is left hanging freely from the case. The hanging tether may catch on objects in the environment of the mobile electronic device and brake off. Also, in some protective cases, a user must continually hold the tether open with their fingers for continued access to the port because the rubbery tether resists pivoting and is biased towards getting the plug back in the port. This is inconvenient.

SUMMARY OF THE INVENTION

This disclosure provides a protective case for a mobile electronic device that protects the complete device from general wear and tear including protection of the screen and body from scratching and protection of the ports from moisture and/or dust. The protective case of the present disclosure provides a gate for access to a port of the mobile electronic device. The gate effectively protects the port from moisture and/or dust and, importantly, does not require the user to unplug or open anything to access the port.

To, for example, plug in a charger plug to the charger port of the mobile electronic device, the user need only press the charger plug through the gate and into the charger port. After the plug has been connected to the port, the gate continues to provide protection to the port and the mobile electronic device from moisture and/or dust.

Similarly, to unplug the charger plug from the charger port, the user needs only to pull the plug. The gate automatically returns to its previous state, providing moisture and/or dust protection without the user having to plug or install anything into the port.

The case of the present disclosure provides ready access to the plug connected to a port of the device so that the plug may easily and conveniently be unplugged from the port. When the plug is plugged in to the port the user has access to the header of the plug. Thus the user may pull on the header to unplug. The user does not need to remove the mobile electronic device from the case or open any doors to access to the plug.

In addition, the gate design allows it to be located very near the port and thus overall size of the case including its thickness may be kept to a minimum. By minimizing overall size of the case including its thickness, the protective case's overall shape may substantially resemble the shape of the mobile electronic device while still providing substantial protection from wear and tear, moisture and/or dust. This is an improvement over prior art protective cases that are typically large and cumbersome, turning a small and elegant mobile electronic device into a large, inelegant, plastic-covered device.

These and further features of the present invention will be described with reference to the attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 1A illustrates a front view of an exemplary protective case for a mobile electronic device.

FIG. 1B illustrates a side cross-sectional view of the exemplary protective case of FIG. 1A.

FIG. 1C illustrates a bottom view of the exemplary protective case of FIG. 1A.

DETAILED DESCRIPTION

Figure 1D:
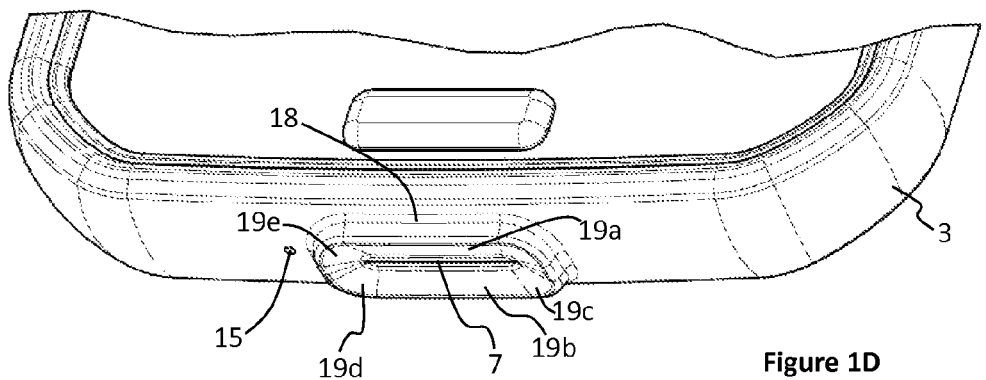
FIG. 1D illustrates a magnified view of a bottom portion of the exemplary protective case of FIG. 1A.

FIGS. 1A-1E illustrate an exemplary protective case 1 for a mobile electronic device D. The case 1 includes a shell 3 that defines a cavity 5 for receiving the mobile electronic device D or at least a portion of the mobile electronic device D. In one embodiment, the shell 3 is substantially a unitary structure. In other embodiments, the shell 3 may be comprised of multiple portions (e.g., front and back portions) that assemble together to form the shell 3.

FIGS. 1A-1C illustrate front, cross-sectional side, and bottom views, respectively, of the exemplary protective case 1.

The shell 3 includes a protective membrane 9 located to correspond to the location of a screen of the mobile electronic device D. The protective membrane 9 allows viewing of the screen or at least some of the screen of the device D and may allow for the use of touchscreen features of the device's screen. The shell 3 may also include a protective membrane 13, similar to the membrane 9, which is located to correspond to a camera lens of the mobile electronic device D. The membranes 9 and 13 may be moisture and/or dust resistant such that they allow for viewing through the membranes while protecting the electronic mobile device D against moisture and/or dust.

The shell 3 may further include acoustic vents 11 and 15 located to correspond to a speaker and a microphone of the mobile electronic device D, respectively. The acoustic vents 11 and 15 may be moisture and/or dust resistant such that they allow sound to travel through the vents while protecting the electronic mobile device D from moisture and/or dust.

Figure 1E:
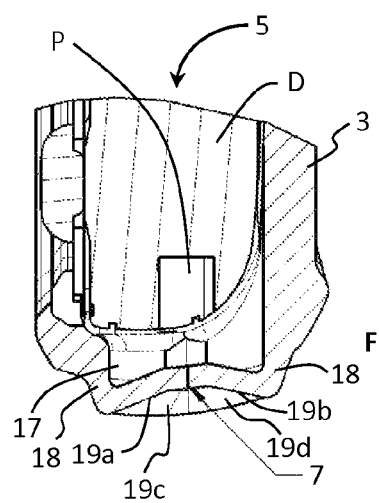
FIG. 1E illustrates a cross-sectional view of a bottom portion of the exemplary protective case of FIG. 1A.

The shell 3 includes a gate 7 that is located adjacent a location corresponding to a port P of the mobile electronic device D. FIG. 1D illustrates a magnified viewed of the bottom portion of the exemplary case 1 in further details including the gate 7. FIG. 1E illustrates a cross-sectional view of a bottom portion of the exemplary protective case 1 including the gate 7.

In the illustrated embodiment, the gate 7 is located adjacent a location corresponding to a port P that is located near the bottom of the mobile electronic device D. In an Apple® iPhone 5, for example, the illustrated location corresponds to the location of the phone's charge/data port. The gate 7, however, may be adjacent locations other than near the bottom (e.g., side, top, front, back, etc.) of the mobile electronic device D or adjacent locations corresponding to ports other than charge or data ports (e.g., headphones port, HDMI port, USB port, etc.) of the mobile electronic device D.

Also, in the illustrated embodiment, the gate 7 has an elongated shape reminiscent of a rectangle with rounded corners and including a similarly shaped slit or seam inside the rectangle. The illustrated embodiment of the gate 7 corresponds to the charger/data port of a particular mobile electronic device, an Apple® iPhone 5. The disclosed invention, however, is not limited to a particular mobile electronic device and thus the gate 7 (as well as other features of the case 1) may have shapes different from those illustrated to work properly with ports of other mobile electronic devices.

As described in more detail below, the gate 7 protects the mobile electronic device D and particularly the port P against moisture and/or dust when nothing is connected to the port P. As also described below, the gate 7 provides easy access to the port P for a connector (e.g., charger plug, headphone plug, data plug, etc.) A user may connect the connector to the port P via the gate 7 without having to remove the mobile electronic device D from the case 1 or having to open doors or having to unplug anything to gain access to the port P. Further, the gate 7 protects the mobile electronic device D and the port P against moisture and/or dust even when the connector is connected to the port P.

With particular reference to FIGS. 1D and 1E, the gate 7 includes a closeable orifice 17 located adjacent the location corresponding to the port P of the mobile electronic device D. The gate 7 also includes a flange 18 generally shaped to correspond to the port P that the gate 7 is designed to protect. In the illustrated embodiment, the flange 18 has an elongated shape reminiscent of a rectangle with rounded corners, which generally corresponds to the charger/data port of an Apple® iPhone 5. As discussed above, however, in other embodiments (not shown) the gate 7, and thus the flange 18, may have shapes different from those illustrated to work properly with ports of other mobile electronic devices. The gate 7 also includes elastomeric flaps 19, exemplary of which are flaps 19a-e. The orifice 17 is closeable and openable by operation of the elastomeric flaps 19 as described below. The flange 18 extends away from the case 3 to create space between the device D and the gate 7 such that the elastomeric flaps 19 may fold in when the gate 7 opens.

Figure 2A:
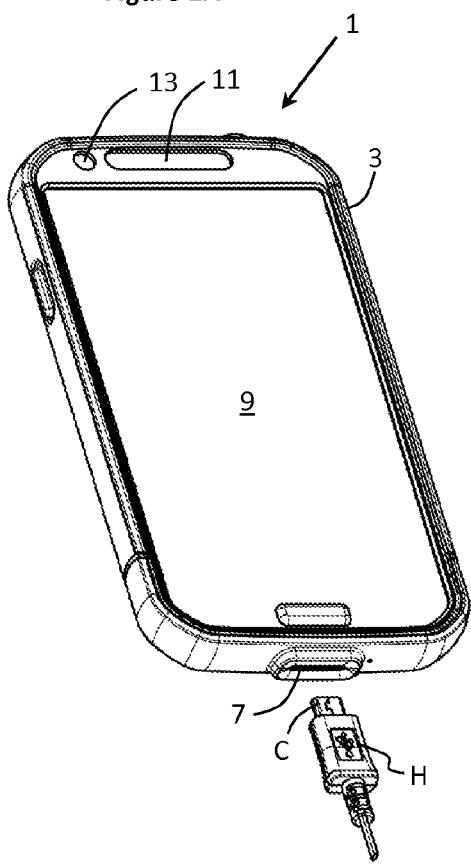
FIG. 2A illustrates a perspective view of an exemplary protective case for a mobile electronic device and a connector unplugged from the mobile electronic device.
Figure 3A:
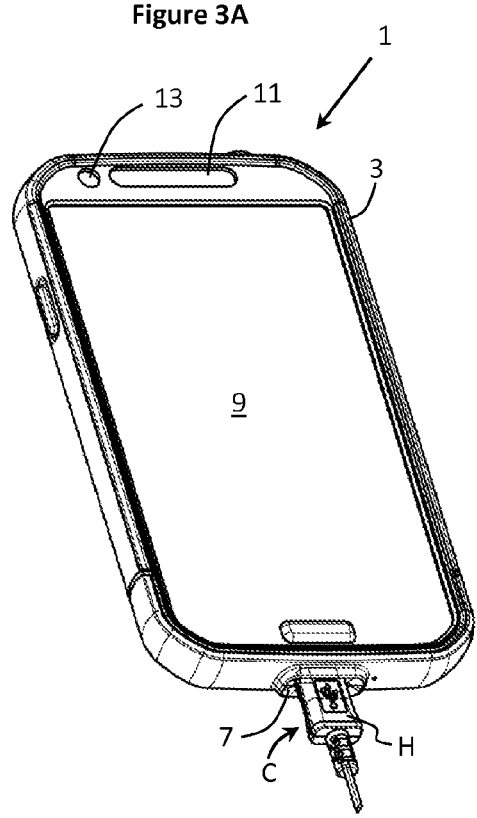
FIG. 3A illustrates a perspective view of the exemplary protective case for a mobile electronic device and a connector plugged in to the mobile electronic device.
Figure 2B:
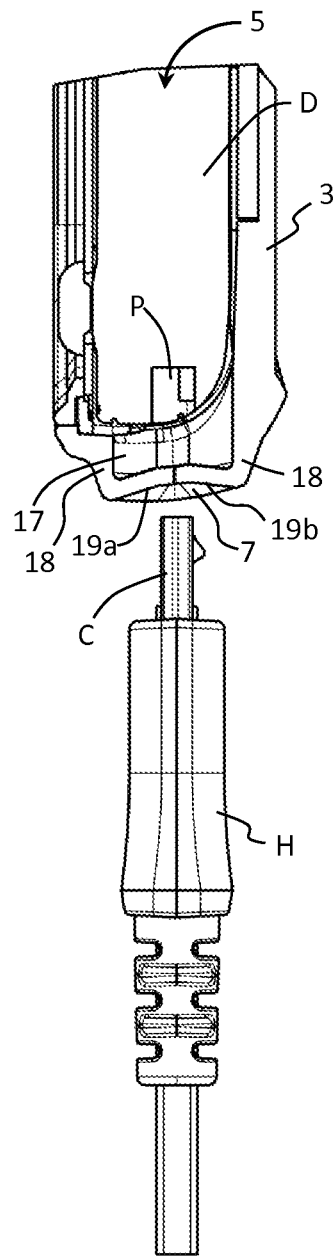
FIG. 2B illustrates a cross-sectional view of a bottom portion of the exemplary protective case of FIG. 2A and the connector unplugged from the mobile electronic device.
Figure 3B:
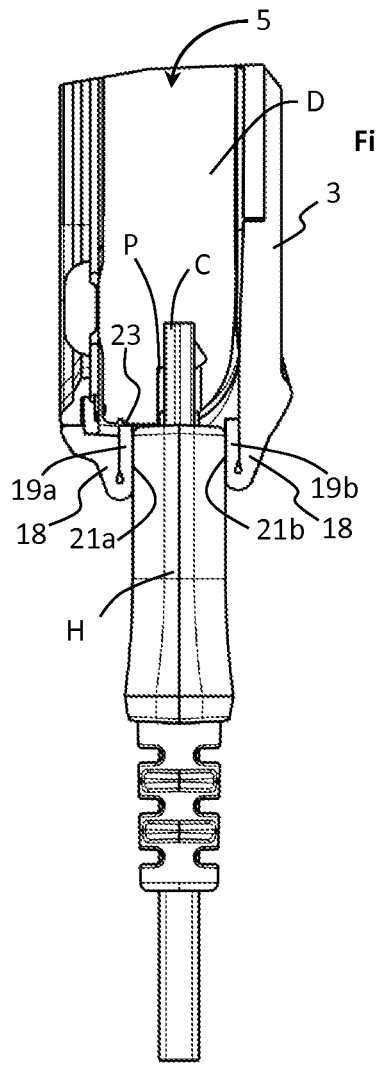
FIG. 3B illustrates a cross-sectional view of a bottom portion of the exemplary protective case of FIG. 3A and the connector plugged in to the mobile electronic device.

FIG. 2A-3B illustrate the exemplary protective case 1 and an exemplary connector C for connection to the port P of the mobile electronic device D. FIGS. 2A and 2B illustrate the connector C disconnected from the port P while FIGS. 3A and 3B illustrate the connector C connected to the port P.

While the figures illustrate the connector C as a male plug connecting to a female port P, the gender of the connector C and the port P is of no import in regards to the present invention. The connector C may be a female jack or socket and the port P may be a male plug, or the connector pair formed by the connector C and the port P may involve multiple gender or genderless terminals.

When the connector C is not connected to the port P, as illustrated in FIGS. 2A and 2B, the gate 7 is in a port covering state in which the gate 7 is closed protecting the port P from environment outside of the protective case 1 including from moisture and/or dust. As illustrated in some detail in FIG. 2B (as well as in FIGS. 1D and 1E), in the port covering state the elastomeric flaps 19 converge with each other forming seams thereby closing the gate 7. Although in the illustrated embodiment the elastomeric flaps 19 abut each other in the port covering state, in other embodiments, the flaps 19 may, instead or in addition to abutting each other, overlap each other to form seams and provide protection to the port P.

On the other hand, when the connector C is connected to the port P, as illustrated in FIGS. 3A and 3B, the gate 7 is in a port accessing state in which the gate 7 is opened providing a passageway for the connector C to connect to the port P. In the illustrated embodiment the connector C is partially shrouded by a header H. The gate 7 may be opened to the port accessing state by pressing of the connector C and/or the header H against the elastomeric flaps 19, or against the seam or seams formed by the converging (e.g., abutting, overlapping, etc.) of the elastomeric flaps 19. The applied pressure causes the flaps 19 to separate and fold in opening the gate 7 and providing a passageway through the orifice 17 for the connector C to connect to the port P.

Even in the port accessing state, with the connector C connected to the port P, the gate 7 protects the port P from environment outside of the protective case 1 including from moisture and/or dust. As illustrated in some detail in FIG. 3B, when the connector C is connected to the port P, surfaces 21 of at least some of the elastomeric flaps 19 abut against the header H. The surfaces 21a and 21b of the flaps 19a and 19b, respectively, abut against the header H substantially preventing passage of moisture and/or dust around the header H and thus substantially protecting the port P from the outside environment. Although not shown, surfaces of flaps 19 other than flaps 19a and 19b (e.g., flaps 19c-e) may also abut against the header H to substantially prevent passage of moisture and/or dust around the header H.

The connector C may be disconnected from the port P by pulling the connector C by the header H. When the connector C is disconnected from the port P, as illustrated in FIG. 3A, the gate 7 returns to the port covering state in which the gate 7 is closed. The elastomeric flaps 19 once again converge (e.g., abut, overlap, etc.) with each other forming at least one seam and thus protecting the mobile electronic device D and the port P from the outside environment.

As discussed in the Background section above, minimizing the overall size of the case 1 including its thickness may be desirable. To this end, the gate 7 may be located as close to the port P as possible. In FIG. 3B, the gate 7 is located immediately adjacent the port P or a portion of the mobile electronic device D surrounding the port P. In the port accessing state, an end 23 of the elastomeric flap 19a is immediately or near immediately adjacent the port P or a portion of the mobile electronic device D surrounding the port P.

This design of the gate 7, flange 18 and the elastomeric flaps 19, in which the gate 7 is as close to the device D and the port P as practically possible, may ensure that the size and particularly the thickness of the case 1 is kept to a minimum. By minimizing overall size, the case 1 may substantially resemble the general shape of the mobile electronic device D while it provides easy and convenient access to ports of the device D and effectively protects the device D from moisture and/or dust.

Although the illustrated protective case 1 corresponds to a specific illustrated mobile electronic device, it should be understood that the features of the disclosed invention are available for other mobile electronic devices.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A protective case for a mobile electronic device, the case comprising:
    a shell defining a cavity for receiving a portion of the mobile electronic device within the cavity, the shell including:
        a membrane disposed adjacent a portion of the cavity corresponding to a screen of the mobile electronic device when the portion of the mobile electronic device is received within the cavity such that at least some of the screen of the mobile electronic device is viewable through the membrane; and
        a gate disposed adjacent a portion of the cavity corresponding to a port of the mobile electronic device when the portion of the mobile electronic device is received within the cavity, the gate including a flange defined by a continuous perimeter and that is disposed at an end of the protective case, and elastomeric flaps attached to the flange, ends of the elastomeric flaps meeting to form a slit surrounded by the perimeter, and operable to at least two states including:
            a port covering state in which the ends of the elastomeric flaps converge at the slit to close the gate protecting the port from environment outside of the protective case, and
            a port accessing state in which the ends of the elastomeric flaps separate and fold in towards the cavity and towards the flange opening the slit to open the gate providing a passageway to the cavity.

2. The protective case of claim 1, wherein, in the port accessing state, an end of at least one of the elastomeric flaps is immediately adjacent a portion of the cavity corresponding to a portion of the port or a portion of the mobile electronic device surrounding the port when the portion of the mobile electronic device is received within the cavity.

3. The protective case of claim 1, wherein the gate is operable to open to the port accessing state by pressing against the elastomeric flaps of the gate.

4. The protective case of claim 1, wherein the flange extends away from the cavity and, in the port accessing state, surfaces of the elastomeric flaps abut against the flange.

5. The protective case of claim 1, wherein removal of pressure against surfaces of the elastomeric flaps returns the gate to the port covering state.

6. The protective case of claim 1, wherein the ends of the elastomeric flaps are separated by pressing against the slit.

7. The protective case of claim 1, wherein, in the port accessing state, surfaces of the elastomeric flaps abut against other portions of the gate.

8. A protective case for a mobile electronic device, the case comprising:
    a shell defining a cavity for receiving at least a portion of the mobile electronic device within the cavity, the shell including:
        a membrane located adjacent a portion of the cavity corresponding to a screen of the mobile electronic device when the portion of the mobile electronic device is within the cavity such that at least some of the screen of the mobile electronic device is viewable through the membrane; and a gate located adjacent a portion of the cavity corresponding to a port of the mobile electronic device when the portion of the mobile electronic device is within the cavity, the gate including a flange that is defined by a continuous perimeter and that is disposed at an end of the protective case, and one or more elastomeric flaps attached to the flange, ends of the one or more elastomeric flaps meeting to form a slit surrounded by the perimeter, and operable to at least two states including:

a port covering state in which ends of the one or more elastomeric flaps converge to provide protection to the port from environment outside of the protective case when the portion of the mobile electronic device is within the cavity, and a port accessing state in which the ends of the one or more elastomeric flaps are separated and folded in towards the cavity and towards the flange opening the slit to provide a passageway to the port.

9. The protective case of claim 8, wherein in the port covering state the one or more ends of the elastomeric flaps abut at the slit to close the gate providing the protection to the port from the environment outside of the protective case.

10. The protective case of claim 8, wherein, in the port accessing state, the one or more ends of the elastomeric flaps separate and fold in to open the gate providing a passageway for a connector to be connected to the port of the mobile electronic device.

11. The protective case of claim 8, wherein the gate is operable to open to the port accessing state by pressing against the gate.

12. The protective case of claim 8, wherein, in the port accessing state, surfaces of the one or more elastomeric flaps abut against the flange of the gate.

13. The protective case of claim 8, wherein removal of pressure against the one or more elastomeric flaps returns the gate to the port covering state.

14. The protective case of claim 8, wherein, in the port covering state, the ends of the one or more elastomeric flaps abut at the slit to close the gate to provide the protection to the port from the environment outside of the protective case, and wherein the ends of the one or more elastomeric flaps are separated by pressing against the slit.

15. The protective case of claim 8, wherein, in the port accessing state, surfaces of the one or more elastomeric flaps abut against another portion of the gate.

16. A protective case for a mobile electronic device, the case comprising:

a shell defining a cavity for receiving at least a portion of the mobile electronic device within the cavity, the shell including:

a membrane located adjacent a portion of the cavity corresponding to a screen of the mobile electronic device when the portion of the mobile electronic device is within the cavity such that at least some of the screen of the mobile electronic device is viewable through the membrane; and a gate having a closeable orifice, the gate including a flange defined by a continuous perimeter, and located at an end of the protective case adjacent a portion of the cavity corresponding to a port of the mobile electronic device when the portion of the mobile electronic device is within the cavity, the gate operable to:

a port covering state in which the orifice of the gate is closed by ends of an elastomeric portion of the gate meeting at a seam surrounded by the continuous perimeter, and a port accessing state in which the orifice is opened by pressing against the gate to fold the elastomeric portion of the gate towards the continuous perimeter such that ends of the elastomeric portion separate opening the seam to provide a passageway to the cavity, wherein removal of pressure against the gate returns the gate to the port covering state.

17. The protective case of claim 16, wherein in the port accessing state, the ends of the elastomeric portion are separated by pressing against the seam to provide the passageway, and surfaces of the elastomeric portion abut against a portion of the gate defining the perimeter.

18. The protective case of claim 17, wherein, in the port accessing state, an end of the elastomeric portion is immediately adjacent a portion of the cavity corresponding to a portion of the port or a portion of the mobile electronic device surrounding the port when the portion of the mobile electronic device is within the cavity.

* * * * *